(12) United States Patent
Ochiai et al.

(10) Patent No.: US 11,704,235 B2
(45) Date of Patent: Jul. 18, 2023

(54) MEMORY SYSTEM AND STORAGE DEVICE (71) Applicant: Kioxia Corporation, Tokyo (JP)

(72) Inventors: Shogo Ochiai, Kamakura (JP); Nobuaki Tojo, Yokohama (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/335,512

(22) Filed: Jun. 1, 2021

(65) Prior Publication Data

US 2022/0300410 A1 Sep. 22, 2022

(30) Foreign Application Priority Data

Mar. 18, 2021 (JP) ................................ 2021-045256

(51) Int. Cl.
*G06F 12/02* (2006.01)
*G06F 12/12* (2016.01)
*G06F 12/08* (2016.01)
*G06F 12/123* (2016.01)
*G06F 12/0891* (2016.01)

(52) U.S. Cl.
CPC ...... *G06F 12/0246* (2013.01); *G06F 12/0253* (2013.01); *G06F 12/0891* (2013.01); *G06F 12/123* (2013.01); *G06F 2212/7201* (2013.01)

(58) Field of Classification Search
CPC ............. G06F 12/0246; G06F 12/0253; G06F 12/0891; G06F 12/123; G06F 2212/7201
See application file for complete search history.

(56) References Cited

U.S. PATENT DOCUMENTS

| 8,484,423 | B2 | 7/2013 | Ohara | |
|---|---|---|---|---|
| 2016/0062913 | A1* | 3/2016 | Woo | G06F 12/0891 |
| | | | | 711/135 |
| 2018/0275899 | A1* | 9/2018 | Munsil | G06F 12/123 |
| 2021/0026777 | A1* | 1/2021 | Byun | G06F 12/1072 |
| 2022/0091976 | A1* | 3/2022 | Soukhman | G06F 12/0824 |

FOREIGN PATENT DOCUMENTS

| JP | 2000-347941 A | 12/2000 |
|---|---|---|
| JP | 2003-228518 A | 8/2003 |

* cited by examiner

*Primary Examiner* — Masud K Khan
(74) *Attorney, Agent, or Firm* — Oblon, McClelland, Maier & Neustadt, L.L.P.

(57) ABSTRACT

A memory system of an embodiment includes a nonvolatile memory, a primary cache memory, a secondary cache memory, and a processor. The processor performs address conversion by using logical-to-physical address conversion information relating to data to be addressed in the nonvolatile memory. Based on whether first processing is performed on the nonvolatile memory or second processing is performed on the nonvolatile memory, the processor controls to store whether the logical-to-physical address conversion information relating to the first processing to be in the primary cache memory as cache data or logical-to-physical address conversion information relating to the second processing to be in the secondary cache memory as cache data.

16 Claims, 6 Drawing Sheets

MEMORY SYSTEM AND STORAGE DEVICE

CROSS-REFERENCE TO RELATED APPLICATIONS

This application is based upon and claims the benefit of priority from the prior Japanese Patent Application No. 2021-45256 filed in Japan on Mar. 18, 2021; the entire contents of which are incorporated herein by reference.

FIELD

An embodiment of the present invention described herein relates generally to a memory system and a storage device.

BACKGROUND

In memory systems, there is a demand for a high cache hit rate of a cache memory to achieve a high-speed response to a host.

DETAILED DESCRIPTION

A memory system of an embodiment includes: a nonvolatile memory; a first cache memory; a second cache memory; and a control circuit configured to perform address conversion by using logical-to-physical address conversion information relating to data to be addressed in the nonvolatile memory, wherein based on whether first processing is performed on the nonvolatile memory or second processing different from the first processing is performed on the nonvolatile memory, the control circuit controls to store whether the logical-to-physical address conversion information relating to the first processing to be in the first cache memory as first cache data or logical-to-physical address conversion information relating to the second processing to be in the second cache memory as second cache data.

Hereinafter, an embodiment will be described with reference to drawings.

1. Configuration

[Overall Configuration of Storage Device]

An overall configuration of a storage device according to the present embodiment will be described with reference to FIG. 1. In the description, a storage device including a NAND flash memory is taken as an example.

Figure 1:
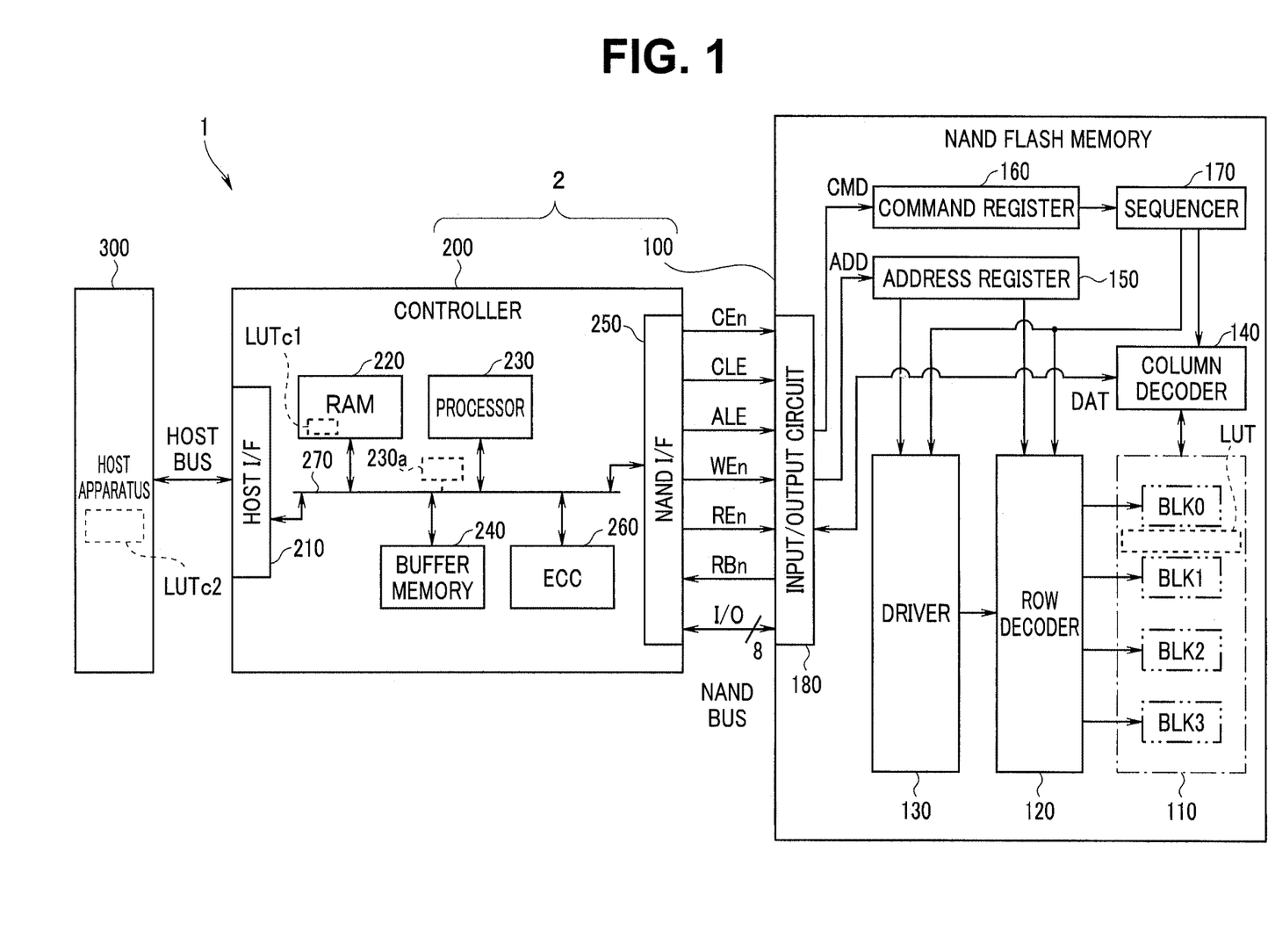
FIG. 1 is a block diagram for describing a configuration of a storage device of an embodiment.

FIG. 1 is a block diagram for describing a configuration of a storage device 1 according to the present embodiment. As shown in the drawing, the storage device 1 includes a nonvolatile memory 100, a memory controller (hereinafter also simply referred to as "controller") 200, and a host apparatus 300.

In the embodiment, the nonvolatile memory 100 is a NAND flash memory, for example. However, the nonvolatile memory 100 may be a nonvolatile memory, such as another type of flash memory or an MRAM. A memory system 2 includes the nonvolatile memory 100 and the memory controller 200. The memory system 2 may be a memory card, such as an SD card, or a storage device, such as an SSD (solid-state drive).

The nonvolatile memory 100 includes a plurality of memory cells, and the plurality of memory cells can store data in a nonvolatile manner. The controller 200 is connected to the nonvolatile memory 100 via a NAND bus, and is connected to the host apparatus 300 via a host bus.

The controller 200 controls reading and writing of data from and into the nonvolatile memory 100. The host apparatus 300 transmits a request to access the nonvolatile memory 100 to the controller 200. The controller 200 accesses the nonvolatile memory 100 in response to the request received from the host apparatus 300. The host apparatus 300 may be a digital camera or a personal computer, for example. The host bus conforms to an SD (trademark) interface, a PCIe (trademark) (peripheral component interconnect express), or an NVMe (trademark) (non-volatile memory express), for example. The NAND bus conforms to a NAND interface.

Various signals are transmitted/received between the nonvolatile memory 100 and the controller 200 via the NAND bus. A chip enable signal CEn, a command latch enable signal CLE, an address latch enable signal ALE, a write enable signal WEn, and a read enable signal REn are transmitted to the nonvolatile memory 100 from the controller 200. A ready/busy signal RBn is transmitted to the controller 200 from the nonvolatile memory 100. An input/output signal I/O is transmitted/received between the nonvolatile memory 100 and the controller 200. The input/output signal I/O is an entity of data transmitted/received between the nonvolatile memory 100 and the controller 200. The input/output signal I/O may be a command, an address, write data, or read data, for example.

The chip enable signal CEn is a signal for enabling the nonvolatile memory 100, and is asserted at a low level. The command latch enable signal CLE is a signal which notifies the nonvolatile memory 100 that the input/output signal I/O is a command. The address latch enable signal ALE is a signal which notifies the nonvolatile memory 100 that the input/output signal I/O is an address. The write enable signal WEn is a signal which is asserted at a low level, and notifies the nonvolatile memory 100 that the input/output signal I/O is to be written into the nonvolatile memory 100 as write data. The read enable signal REn is a signal which is also asserted at a low level, and is for outputting data read from the nonvolatile memory 100 to the input/output signal I/O. The ready/busy signal RBn is a signal indicating whether the nonvolatile memory 100 is in a ready state (a state where the nonvolatile memory 100 can receive an instruction from the controller 200) or in a busy state (a state where the nonvolatile memory 100 cannot receive an instruction from the controller 200). The low level of the ready/busy signal RBn indicates the busy state. The input/output signal I/O may be a signal of 8 bits, for example.

[Configuration of Controller]

Next, a configuration of the controller 200 will be described in detail. As shown in FIG. 1, the controller 200 is a circuit including a host interface (I/F) circuit 210, a random access memory (hereinafter referred to as "RAM") 220, which is a built-in memory, a processor 230 including a central processing unit (CPU), a buffer memory 240, a NAND interface circuit 250, and an ECC (error checking and correcting) circuit 260. These circuits are connected to each other via a bus 270.

The host interface circuit 210 is connected to the host apparatus 300 via the host bus. The host interface circuit 210 transfers a request received from the host apparatus 300 and designating a logical address corresponding to a physical address of the nonvolatile memory to the processor 230, and transfers data received from the host apparatus 300 to the buffer memory 240. The host interface circuit 210 also transfers data in the buffer memory 240 to the host apparatus 300 in response to a command from the processor 230.

The RAM 220 is a semiconductor memory, such as a DRAM or an SRAM, and is used as a work area of the processor 230. The RAM 220 stores firmware to manage the nonvolatile memory 100, and a portion of management information MI. The management information MI is a logical-to-physical address conversion table LUT, shift table information or the like.

Logical-to-physical address conversion information is stored in the logical-to-physical address conversion table LUT, which is provided to a portion of a storage area of a memory cell array 110, in a nonvolatile manner. The logical-to-physical address conversion table LUT (also referred to as "lookup table") stores address conversion information. The logical-to-physical address conversion information is information by which a logical address indicating a position in a logical address space is associated with a physical address indicating a position in the nonvolatile memory 100.

A portion of the logical-to-physical address conversion information is stored in a portion of the RAM 220 as cache data. A predetermined storage area of the RAM 220 is used as a primary cache memory LUTc1. That is to say, the primary cache memory LUTc1 is included in the controller 200. The primary cache memory LUTc1 may be a dedicated memory different from the RAM 220.

In the present embodiment, the storage area forming a portion of the memory of the host apparatus 300 is used as a secondary cache memory LUTc2.

In the present embodiment, the secondary cache memory LUTc2 is a portion of an HMB (host memory buffer). The storage capacity of the HMB is set by the host apparatus 300. Provided that the secondary cache memory LUTc2 is an apparatus having a function of a cache memory equivalent to the cache memory in the present embodiment, the secondary cache memory LUTc2 may be provided separately from the host apparatus 300 or the controller 200.

As described above, in the present embodiment, the primary cache memory LUTc1 serving as a first cache memory and the secondary cache memory LUTc2 serving as a second cache memory are provided as cache memories for the logical-to-physical address conversion table LUT.

In the present embodiment, access (the time period from the point when a request for data is made to the point when the data are acquired) to the secondary cache memory LUTc2 is slower than access to the primary cache memory LUTc1 although the access is faster than access to the nonvolatile memory 100 because the host apparatus 300 is connected to the memory system 2 via the host bus. The storage area of the host apparatus 300 is used as the secondary cache memory LUTc2 and hence, the storage capacity of the secondary cache memory LUTc2 is larger than the storage capacity of the primary cache memory LUTc1 because a part of storage area of the host apparatus 300 having a large capacity can be assigned to the secondary cache memory LUTc2.

The processor 230 acquires logical-to-physical address conversion information by reference to the primary cache memory LUTc1 and the secondary cache memory LUTc2 (hereinafter, two cache memories being collectively referred to as "cache memory"), and then converts a logical address from the host apparatus 300 to a physical address.

That is to say, the processor 230 forms a control circuit that performs address conversion by using logical-to-physical address conversion information relating to data to be addressed in the nonvolatile memory 100. The processor 230 stores and manages logical-to-physical address conversion information in the logical-to-physical address conversion table LUT in predetermined management units.

In the present embodiment, the processor 230 manages the logical-to-physical address conversion table LUT. However, a processor different from the processor 230 may manage logical-to-physical address conversion information in the logical-to-physical address conversion table LUT. In such a case, a processor 230a dedicated to the LUT shown by a dotted line in FIG. 1 is connected to the bus 270. When the dedicated processor 230a receives a request to retrieve logical-to-physical address conversion information from the processor 230, the dedicated processor 230a returns a retrieval result to the processor 230.

The processor 230 controls the operation of the entire controller 200. For example, when the processor 230 receives a request for data from the host apparatus 300, the processor 230 performs logical-to-physical address conversion in response to the request for data, and issues a read command to the NAND interface circuit 250. Also when the processor 230 receives a request to write data and a request to erase data from the host apparatus 300, the processor 230 performs logical-to-physical address conversion, and issues a command corresponding to the received request to the NAND interface circuit 250 in the same manner. Further, the processor 230 performs various processing to manage the nonvolatile memory 100, such as garbage collection (also referred to as "compaction") or wear leveling (also referred to as "leveling processing").

The wear leveling is processing of causing rewriting of data to be performed in a uniformly dispersed manner throughout the entire nonvolatile memory 100 to prevent the rewriting of data from being performed in a concentrated manner on a specific memory cell or a specific block.

The garbage collection is processing performed when the number of available blocks or free blocks reduces with an increase in the amount of written data. In the garbage collection, data discretely stored in a plurality of blocks on the nonvolatile memory 100 are copied to a specific block to form available blocks or free blocks, so that new data can be written into such available blocks or free blocks. In such garbage collection processing, the processor 230 performs processing of updating logical-to-physical address conversion information with a change in position of the address of data stored in the nonvolatile memory 100.

The buffer memory 240 temporarily stores write data or read data.

The NAND interface circuit 250 is connected to the nonvolatile memory 100 via the NAND bus, and controls communication with the nonvolatile memory 100. The NAND interface circuit 250 transmits various signals including a command and data to the nonvolatile memory 100 and receives various signals and data from the nonvolatile memory 100 based on a command received from the processor 230.

Based on the command received from the processor 230, the NAND interface circuit 250 outputs a chip enable signal CEn, a command latch enable signal CLE, an address latch enable signal ALE, a write enable signal WEn, and a read enable signal REn to the nonvolatile memory 100. In writing data, the NAND interface circuit 250 transfers a write command issued by the processor 230, an address (physical address), and write data in the buffer memory 240 to the nonvolatile memory 100 as input/output signals I/O. In reading data, the NAND interface circuit 250 transfers a read command issued by the processor 230 and an address (physical address) to the nonvolatile memory 100 as input/output signals I/O, receives data read from the nonvolatile memory 100 as an input/output signal I/O, and transfers the data to the buffer memory 240.

The ECC circuit 260 performs error detection and error correction processing on data stored in the nonvolatile memory 100. That is to say, in writing data, the ECC circuit 260 generates an error correction code, and applies such an error correction code to write data. In reading data, the ECC circuit 260 decodes data while performing error correction.

[Configuration of Nonvolatile Memory]

Next, a configuration of the nonvolatile memory 100 will be described. As shown in FIG. 1, the nonvolatile memory 100 includes the memory cell array 110, a row decoder 120, a driver 130, a column decoder 140, an address register 150, a command register 160, a sequencer 170, and an input/output circuit 180.

The memory cell array 110 may be a NAND flash memory including a plurality of blocks BLK, for example. Each block BLK includes a plurality of nonvolatile memory cells that are associated with rows and columns. In FIG. 1, four blocks BLK0 to BLK3 are illustrated as examples. The memory cell array 110 can store data given from the controller 200 in a nonvolatile manner.

The row decoder 120 selects any one of the blocks BLK0 to BLK3 based on an address ADD (physical address) in the address register 150, and further selects a word line WL in the selected block BLK.

The driver 130 generates various voltage signals for the selected block BLK based on a block address BA and a page address PA in the address register 150, and supplies a voltage to the selected block BLK via the row decoder 120.

The input/output circuit 180 is a circuit which transmits/receives the above-mentioned various signals to and from the controller 200 via the NAND bus. The input/output circuit 180 outputs an address ADD to the address register 150, outputs a command signal CMD to the command register 160, and transmits/receives data DAT between the input/output circuit 180 and the column decoder 140.

The column decoder 140 includes a plurality of data latch circuits and a plurality of sense amplifiers. In reading data, each sense amplifier senses data read from the memory cell array 110, and performs a required arithmetic operation. The column decoder 140 outputs such data DAT to the controller 200 via the data latch circuit. In writing data, the column decoder 140 receives, by the data latch circuit, write data DAT received from the controller 200 and, thereafter, performs an operation of writing the data DAT into the memory cell array 110.

The address register 150 stores an address ADD received from the controller 200. Such an address ADD includes the above-mentioned block address BA and page address PA. The command register 160 stores a command CMD received from the controller 200.

The sequencer 170 controls the operation of the entire nonvolatile memory 100 based on the command CMD stored in the command register 160.

2. Operation (Writing and Reading of Data)

The storage device 1 can save user data, and can read the saved user data to perform various processing on the saved user data. Therefore, the memory system 2 performs processing of writing user data from the host apparatus 300 into the nonvolatile memory 100 and processing of reading user data from the nonvolatile memory 100.

In the processing of writing user data, the processor 230 generates user data (page data) in page units, and outputs a write command, a physical address, and page data to the NAND interface circuit 250 via the ECC circuit 260. The NAND interface circuit 250 outputs the write command and the physical address to the nonvolatile memory 100. When the write processing is performed, the processor 230 updates cache data on the primary cache memory LUTc1 and, thereafter, updates logical-to-physical address conversion information stored in the logical-to-physical address conversion table LUT.

The logical-to-physical address conversion information is information by which the logical address and the physical address of user data are associated with each other. The logical address of user data is an address of the user data in the logical address space of the host apparatus 300.

When new user data are written into the nonvolatile memory 100, new logical-to-physical address conversion information is generated, and the processor 230 writes the new logical-to-physical address conversion information into the primary cache memory LUTc1 as cache data and, thereafter, registers the new logical-to-physical address conversion information in the logical-to-physical address conversion table LUT.

In the case of update of user data in the nonvolatile memory 100, the processor 230 invalidates user data (data written in the nonvolatile memory 100 previously) associated with the logical address of user data to be updated. The processor 230 also updates cache data which corresponds to such user data, and updates data in the logical-to-physical address conversion table LUT.

In the processing of reading user data, the processor 230 acquires logical-to-physical address conversion information by making use of the cache memory (the primary cache memory LUTc1 and the secondary cache memory LUTc2) to acquire a physical address of a page including user data relating to a read request. The processor 230 outputs a read command and the acquired physical address to the NAND interface circuit 250. The NAND interface circuit 250 outputs the read command and the physical address to the nonvolatile memory 100. The processor 230 receives, via the ECC circuit 260, page data read from the nonvolatile memory 100, extracts data relating to the read request from the page data, and transmits the data to the host apparatus 300. Also at this point of operation, the processor 230 also updates cache data, and updates data in the logical-to-physical address conversion table LUT.

As described above, when the processor 230 is accessed by the host apparatus 300, the processor 230 searches a cache memory by using a portion (a tag or the like) of a logical address from the host to retrieve and acquire logical-to-physical address conversion information of the logical address relating to the access. That is to say, in the case where cache data (including logical-to-physical address conversion information) of access target data are present in the cache memory when the processor 230 receives an access request from the host apparatus 300, the processor 230 reads the logical-to-physical address conversion information from the cache memory, and performs read processing or write processing based on the access request.

Further, when the processor 230 receives an access request from the host apparatus 300, the processor 230 updates data in the cache memory. In the update of data, priority information is updated, and required logical-to-physical address conversion information is updated.

(Management of Cache Memory)

Cache data in the primary cache memory LUTc1 and the secondary cache memory LUTc2 are stored according to an LRU (least recently used) method.

In the LRU method, the oldest cache data (that is, cache data which are not used for the longest time period) are given the lowest priority, and cache data with low priority are purged from the cache memory (the primary cache memory LUTc1 and the secondary cache memory LUTc2) to store new cache data in the cache memory (the primary cache memory LUTc1 and the secondary cache memory LUTc2).

In the case where logical-to-physical address conversion information relating to the access request is present in the primary cache memory LUTc1 or the secondary cache memory LUTc2 when the processor 230 receives the access request from the host apparatus 300, the processor 230 performs processing relating to the access request by using cache data of the logical-to-physical address conversion information.

In the case where logical-to-physical address conversion information relating to the access request is not present in the primary cache memory LUTc1 or the secondary cache memory LUTc2 when the processor 230 receives the access request from the host apparatus 300, the processor 230 acquires the logical-to-physical address conversion information from the logical-to-physical address conversion table LUT in the nonvolatile memory 100, and performs processing relating to the access request.

In the case of writing or rewriting of user data, logical-to-physical address conversion information of data relating to the writing or the rewriting is updated in the primary cache memory LUTc1 as cache data.

Each cache data includes the above-mentioned priority information. Priority information is updated each time an access request is received from the host apparatus 300.

In the case where data having temporal locality or spatial locality (i.e. narrow-area access data) are stored in the primary cache memory LUTc1 and the secondary cache memory LUTc2 and where an access request from the host apparatus 300 is narrow-area access, the processor 230 can quickly respond to the access request from the host apparatus 300.

In contrast, in the case where data having no temporal locality or spatial locality (i.e. wide-area access data) are stored in the primary cache memory LUTc1 and the secondary cache memory LUTc2, the processor 230 cannot quickly respond to the access request from the host apparatus 300. The reason is as follows. A probability of a cache hit (cache hit rate) of address conversion information relating to the access request is lowered and hence, the number of times of reading address conversion information relating to the access request from the nonvolatile memory 100 is increased.

Further, when processing, such as garbage collection, is performed in the background irrespective of the access request from the host apparatus 300, for example, the processor 230 updates cache data in the primary cache memory LUTc1 and the secondary cache memory LUTc2.

In the processing of garbage collection, there is a high possibility that wide-area access data are processed so cold data (data with low access frequency) as well as hot data and warm data (data with high access frequency) may be processed.

Therefore, when such garbage collection is performed, cache data in the cache memories LUTc1 and LUTc2 are replaced by the other data having no temporal locality or spatial locality. As a result, a probability of occurrence of a cache miss is increased when an access request is received from the host apparatus 300.

In view of the above, in the present embodiment, logical-to-physical address conversion information used when processing is performed with an access request, such as writing of data into the nonvolatile memory 100, from the host apparatus 300 is stored in the primary cache memory LUTc1 as cache data. Logical-to-physical address conversion information at the time of performing processing, such as garbage collection, which is performed without an access request from the host apparatus 300, is stored in the secondary cache memory LUTc2 as cache data.

The reason for storing logical-to-physical address conversion information in the secondary cache is as follows. If cache data are stored in the primary cache memory LUTc1 in the processing, such as garbage collection, where wide-area access data are data to be processed, the possibility of a cache hit is lowered when access is received from the host apparatus 300 thereafter.

(Processing of Reading and Writing Cache Data)

When the processor 230 performs garbage collection or processing in response to an access request from the host apparatus 300, the processor 230 performs processing of reading and writing cache data corresponding to such garbage collection or processing.

In the present embodiment, garbage collection is taken as an example of processing performed on wide-area access data. Hereinafter, reading and writing of cache data will be described.

Figure 2:
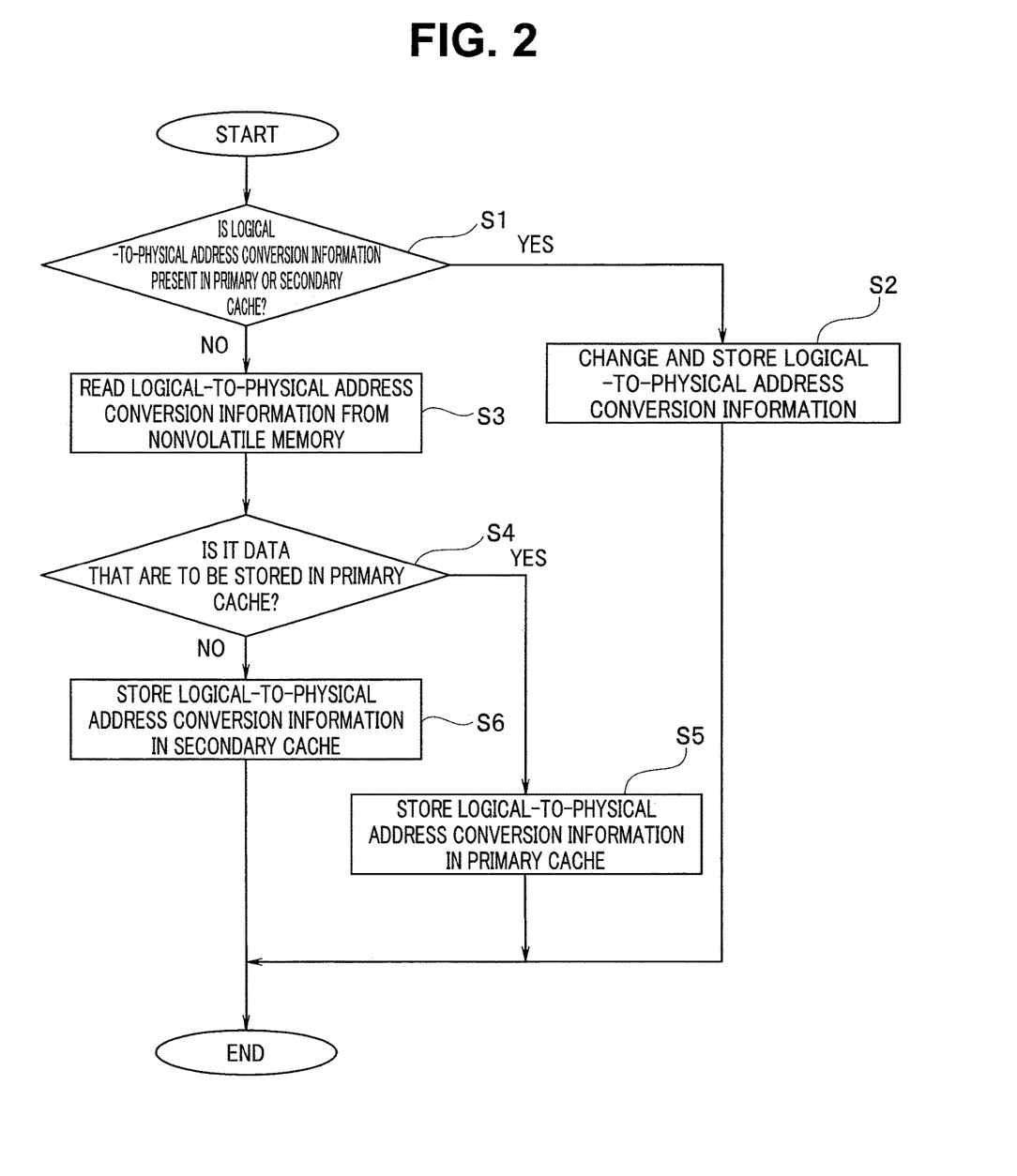
FIG. 2 is a flowchart of processing of reading and writing cache data in a cache memory of the embodiment.
Figure 3:
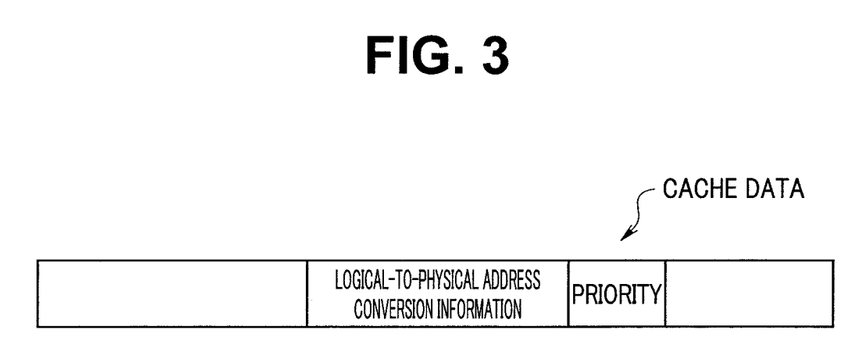
FIG. 3 is a diagram showing one example of the cache data of the embodiment.

FIG. 2 is a flowchart of the processing of reading and writing cache data from and into the cache memory. FIG. 3 is a diagram showing one example of cache data. As shown in FIG. 3, cache data includes logical-to-physical address conversion information and priority information. Cache data also include flag information and the like.

When processing of reading and writing cache memory is performed, the processor 230 determines whether logical-to-physical address conversion information of data to be processed is present in the primary cache memory LUTc1 or the secondary cache memory LUTc2 (step S1). In step S1, the processor 230 first determines whether logical-to-physical address conversion information of data to be processed is present in the primary cache memory LUTc1 When the logical-to-physical address conversion information of data to be processed is not present in the primary cache memory LUTc1, the processor 230 determines whether the logical-to-physical address conversion information of data to be processed is present in the secondary cache memory LUTc2.

When the logical-to-physical address conversion information of data to be processed is present in the primary cache memory LUTc1 or the secondary cache memory LUTc2 (S1: YES), the processor 230 changes priority information and the like of cache data in the primary cache memory LUTc1 or the secondary cache memory LUTc2, and stores the logical-to-physical address conversion information in the logical-to-physical address conversion table LUT (step S2). After step S2 is performed, the processor 230 finishes the processing shown in FIG. 2. However, the processor 230 performs processing in response to a request to access user data or processing of garbage collection by using the stored cache data.

When the logical-to-physical address conversion information of data to be processed are not present in the primary cache memory LUTc1 or the secondary cache memory LUTc2 (S1: NO), the processor 230 reads logical-to-physical address conversion information of data to be processed from the logical-to-physical address conversion table LUT in the nonvolatile memory 100 (step S3).

The processor 230 determines whether the logical-to-physical address conversion information is data that are to be stored in the primary cache memory LUTc1 (step S4). Whether the logical-to-physical address conversion information is data that are to be stored in the primary cache memory LUTc1 is determined based on whether processing currently performed is caused by access from the host apparatus 300 or by the processing of garbage collection.

In the case where the processing currently performed is caused by an access request from the host apparatus 300, it is determined that the logical-to-physical address conversion information of data to be processed is data that are to be stored in the primary cache memory LUTc1. In the case where the processing currently performed is caused by garbage collection, it is determined that the logical-to-physical address conversion information of data to be processed is data that are to be stored in the secondary cache memory LUTc2.

When it is determined that the logical-to-physical address conversion information of data to be processed is data that are to be stored in the primary cache memory LUTc1 (S4: YES), the processor 230 stores the logical-to-physical address conversion information of data to be processed read from the nonvolatile memory 100 in the primary cache memory LUTc1 in a state where the logical-to-physical address conversion information of data to be processed is included in cache data (step S5).

When the primary cache memory LUTc1 is full of cache data, the processor 230 performs processing where data having low priority among cache data in the primary cache memory LUTc1 are purged from the primary cache memory LUTc1, and are written into the secondary cache memory LUTc2.

That is to say, when the primary cache memory LUTc1 becomes full of cache data, the processor 230 moves cache data to be purged from the primary cache memory LUTc1 to the secondary cache memory LUTc2 based on LRU, and stores the cache data in the secondary cache memory LUTc2. In such processing, cache data in the primary cache memory LUTc1 is stored in the secondary cache memory LUTc2 and hence, the processing leads to an increase in the cache hit rate.

When it is determined that the logical-to-physical address conversion information of data to be processed is not data that are to be stored in the primary cache memory LUTc1 (S4: NO), the processor 230 stores the logical-to-physical address conversion information of data to be processed read from the nonvolatile memory 100 in the secondary cache memory LUTc2 in a state where the logical-to-physical address conversion information of data to be processed is included in cache data (step S6).

That is to say, based on whether first processing or second processing is performed on the nonvolatile memory 100, the processor 230 stores logical-to-physical address conversion information relating to the first processing in the first cache memory (the primary cache memory LUTc1) as cache data, or stores logical-to-physical address conversion information relating to the second processing in the second cache memory (the secondary cache memory LUTc2) as cache data.

In the present embodiment, the first processing is an example of processing performed in response to a request from the host apparatus 300 to read data from the nonvolatile memory 100 or a request from the host apparatus 300 to write data into the nonvolatile memory 100. The second processing is an example of processing of garbage collection performed by the processor 230 on the nonvolatile memory 100.

When the secondary cache memory LUTc2 is already full, so that logical-to-physical address conversion information cannot be stored in the secondary cache memory LUTc2 in step S6, the processor 230 performs processing (erasing processing) of purging data having the lowest priority in the secondary cache memory LUTc2 from the secondary cache memory LUTc2 based on LRU.

As described above, logical-to-physical address conversion information read from the nonvolatile memory 100 in the processing of garbage collection is stored in the secondary cache memory LUTc2, and logical-to-physical address conversion information read in response to an access request from the host apparatus 300 is stored in the primary cache memory LUTc1. Cache data in the primary cache memory LUTc1 and cache data in the secondary cache memory LUTc2 are exclusive, and do not overlap with each other.

After step S5 or S6 is performed, the processor 230 finishes processing of reading and writing cache data shown in FIG. 2. However, the processor 230 performs processing relating to a request to access user data or processing of garbage collection by using stored cache data (logical-to-physical address conversion information of data to be processed).

Figure 4:
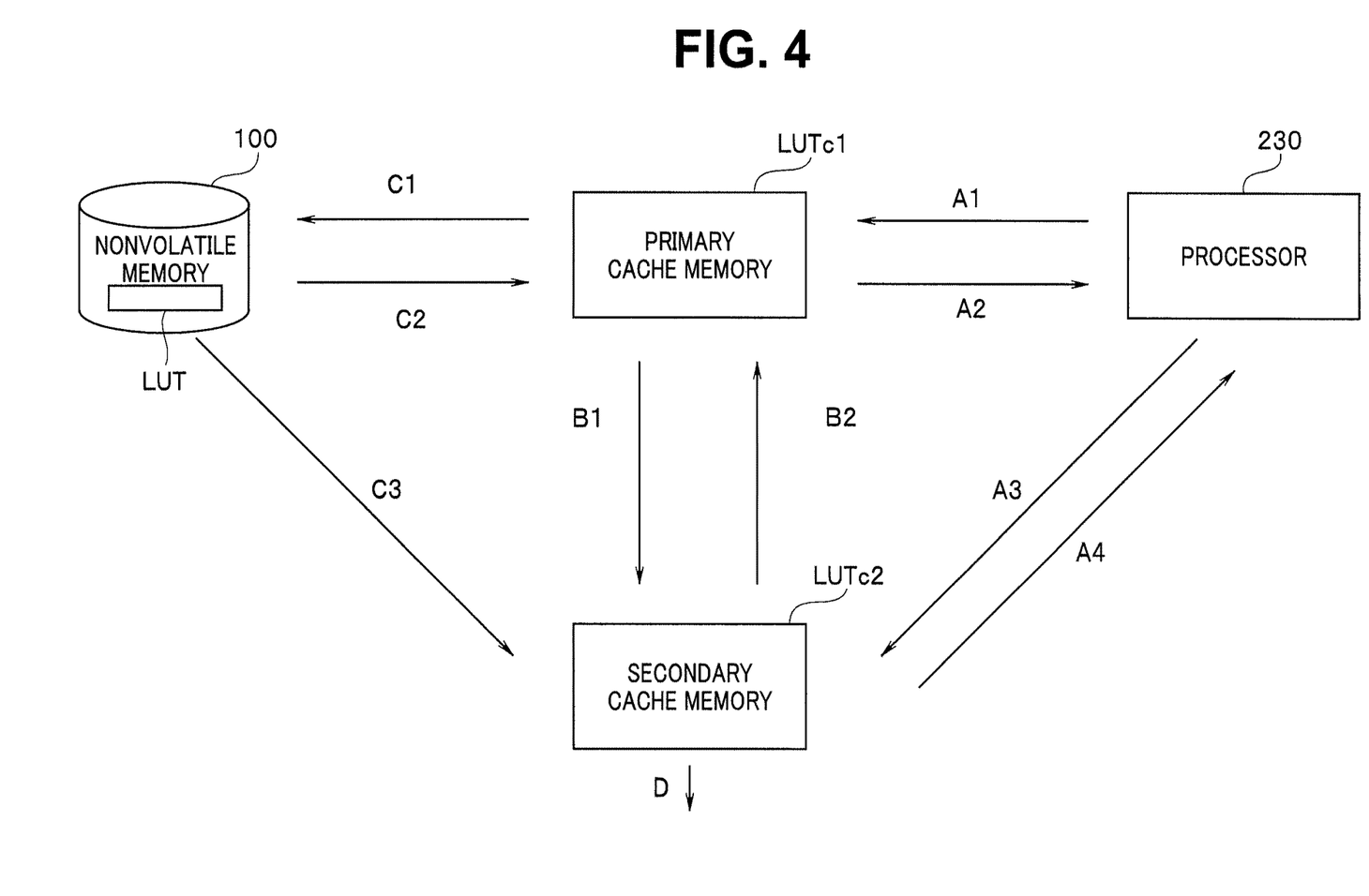
FIG. 4 is a diagram for describing a flow of data relating to a primary cache memory and a secondary cache memory of the embodiment.

FIG. 4 is a diagram for describing a relationship of requests for and acquisition of data among the processor 230, the nonvolatile memory 100, the primary cache memory LUTc1, and the secondary cache memory LUTc2. That is to say, FIG. 4 is a diagram for describing a flow of data.

Symbol "A1" denotes a request for cache data (a request for logical-to-physical address conversion information) from the processor 230 to the primary cache memory LUTc1 in step S1 (a11), storing of logical-to-physical address conversion information from the processor 230 in the primary cache memory LUTc1 in step S5 (a12), and update of cache data in the primary cache memory LUTc1 (a13). Symbol "a13" denotes update of the physical address and update of priority information in cache data in response to an access request from the host apparatus 300, for example.

Symbol "A2" denotes a response (logical-to-physical address conversion information) from the primary cache memory LUTc1 For example, when the processor 230 receives a request from the host apparatus 300 to read user data, the processor 230 retrieves and acquires logical-to-physical address conversion information relating to the read request in the primary cache memory LUTc1. Symbol "A2" denotes a response indicating the retrieval result.

Symbol "A3" denotes a request for cache data (a request for logical-to-physical address conversion information) from the processor 230 to the secondary cache memory LUTc2.

For example, in the case where the logical-to-physical address conversion information relating to the request is not present in the primary cache memory LUTc1 in step S1 when the processor 230 receives a request from the host apparatus 300 to read user data, the processor 230 outputs a request for cache data to the secondary cache memory LUTc2 (A3).

Symbol "A4" denotes a response (logical-to-physical address conversion information) from the secondary cache memory LUTc2.

Symbol "B1" denotes that when data overflow from the primary cache memory LUTc1, the overflowing data are purged and are stored in the secondary cache memory LUTc2.

For example, the processor 230 stores logical-to-physical address conversion information in the primary cache memory LUTc1 in step S5. However, when the primary cache memory LUTc1 is full, the processor 230 purges cache data having the lowest priority in the primary cache memory LUTc1 from the primary cache memory LUTc1, and stores the cache data in (moves the cache data to) the secondary cache memory LUTc2 (B1).

Symbol "B2" denotes movement of data caused with update of logical-to-physical address conversion information in the secondary cache memory LUTc2.

In the case where cache data of logical-to-physical address conversion information relating to the request are present in the secondary cache memory LUTc2, the processor 230 moves the cache data to the primary cache memory LUTc1 and stores the cache data in the primary cache memory LUTc1 and, thereafter, updates the cache data in the primary cache memory LUTc1.

Such operations are performed to prevent that the latest state of cache data in the secondary cache memory LUTc2 cannot be ensured when the power source of the host apparatus 300 is suddenly turned off.

Symbol "C1" denotes access to the logical-to-physical address conversion table LUT when a cache miss occurs (c11), and writing of logical-to-physical address conversion information from the primary cache memory LUTc1 into the logical-to-physical address conversion table LUT (c12).

Symbol "C2" denotes a response of logical-to-physical address conversion information when a cache miss occurs.

When a cache miss of logical-to-physical address conversion information occurs, in step S3, the processor 230 accesses the logical-to-physical address conversion table LUT to acquire logical-to-physical address conversion information (C2).

Symbol "C3" denotes storing of logical-to-physical address conversion information in the secondary cache memory LUTc2. In step S6, the processor 230 directly stores logical-to-physical address conversion information at the time of performing garbage collection in the secondary cache memory LUTc2 in a state where the logical-to-physical address conversion information is included in cache data (C3).

Symbol "D" denotes a purge (data erasure) of data performed by the processor 230 when the secondary cache memory LUTc2 is full.

For example, in the case where the secondary cache memory LUTc2 is full when logical-to-physical address conversion information is written into the secondary cache memory LUTc2 in step S6, the processor 230 purges, that is, erases data having the lowest priority in the secondary cache memory LUTc2 (D).

As described above, cache data stored in the primary cache memory LUTc1 and cache data stored in the secondary cache memory LUTc2 are exclusive. That is to say, cache data stored in the primary cache memory LUTc1 are not stored in the secondary cache memory LUTc2, and cache data stored in the secondary cache memory LUTc2 are not stored in the primary cache memory LUTc1. In other words, cache data to be stored in the primary cache memory LUTc1 and cache data to be stored in the secondary cache memory LUTc2 do not overlap with each other.

Accordingly, the secondary cache memory LUTc2 serves as a memory that stores cache data purged from the primary cache memory LUTc1 to increase the cache hit rate with respect to a request to read data.

Further, as described above, in the processing, such as garbage collection, where wide-area access data are targets, the possibility of a cache hit in response to data access performed after the processing is low and hence, logical-to-physical address conversion information is stored in the secondary cache memory LUTc2. Other logical-to-physical address conversion information is stored in the primary cache memory LUTc1. Therefore, data for narrow-area access are stored in the primary cache memory LUTc1 and hence, the cache hit rate with respect to a read request from the host apparatus 300 is increased.

As described above, even when garbage collection is performed in the background, cache data are stored in the primary cache memory based on LRU and hence, it is possible to suppress the occurrence of a cache miss at a low level.

Further, when the primary cache memory LUTc1 is full of cache data and the cache data overflow, the overflowing cache data are stored in the secondary cache memory LUTc2 and hence, the cache hit rate at the time of reading data is increased.

Figure 5:
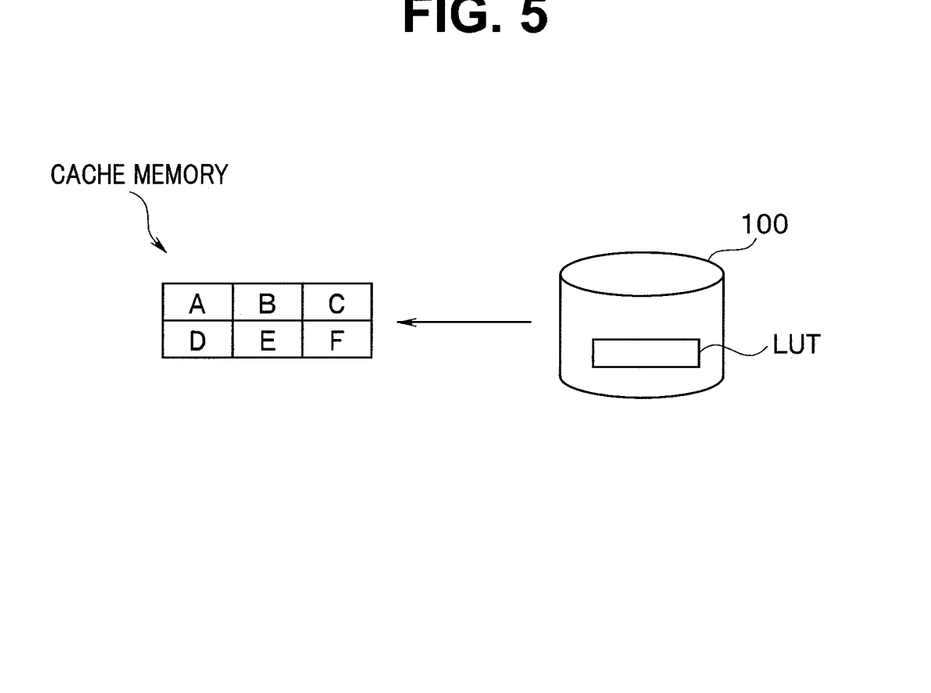
FIG. 5 is a diagram for describing a comparative example.
Figure 6:
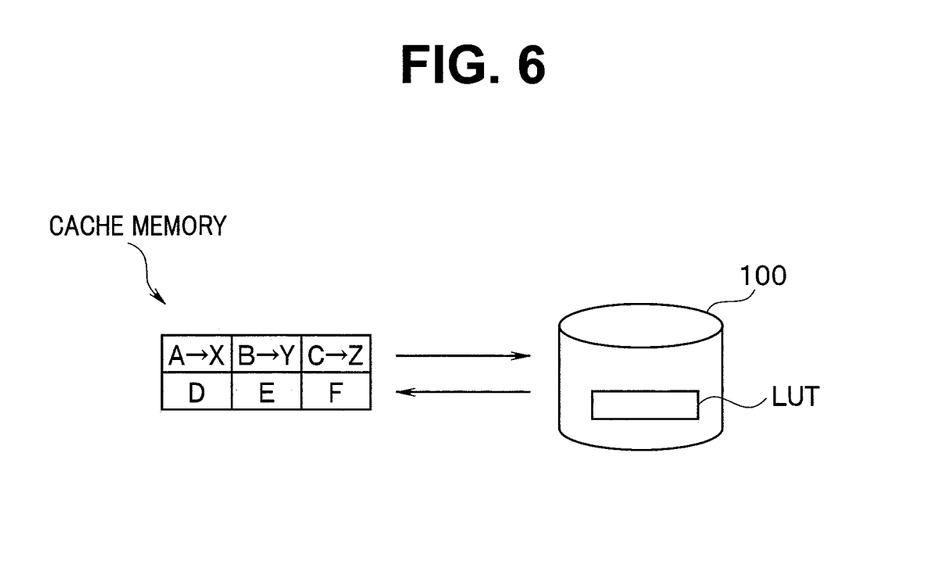
FIG. 6 is a diagram for describing the comparative example.
Figure 7:
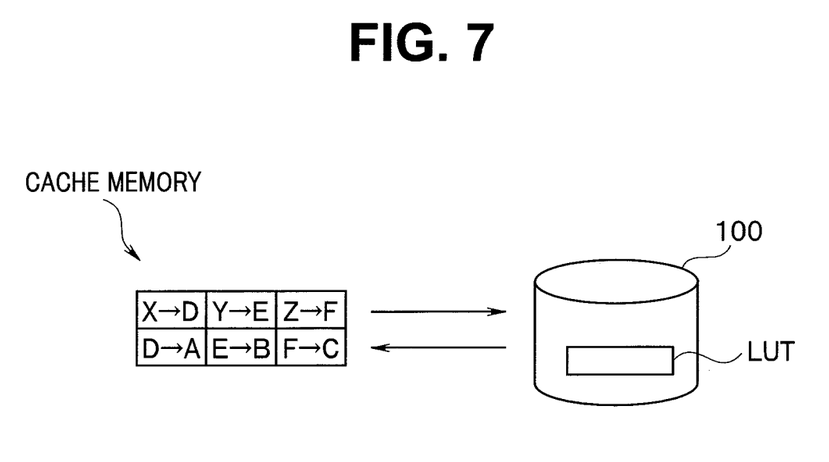
FIG. 7 is a diagram for describing the comparative example.

FIG. 5, FIG. 6, and FIG. 7 are diagrams for describing a comparative example with the present embodiment. In the case where an access request from the host apparatus 300 is narrow-area access, cache data to be updated are only cache data in the cache memory in many cases. In the case where logical-to-physical address conversion information A, B, C, D, E, and F read from the nonvolatile memory 100 is in the cache memory as shown in FIG. 5, a cache hit occurs for these data. Regarding the cache data, logical-to-physical address conversion information A, B, C, D, E, and F are in order of oldest information to newest information. Cache data of logical-to-physical address conversion information A are the oldest cache data, and cache data of logical-to-physical address conversion information F are the newest cache data.

However, when garbage collection is performed, as shown in FIG. 6, cache data are purged in order from the oldest cache data, and are replaced by logical-to-physical address conversion information X, Y, and Z acquired due to the garbage collection.

Thereafter, when a request to access logical-to-physical address conversion information A, B, C, D, E, and F is received from the host apparatus 300, as shown in FIG. 7, according to LRU, information D, E, F, X, Y, and Z is written back in the nonvolatile memory 100 in order from the oldest information, and cache data are overwritten into the cache memory in order of logical-to-physical address conversion information A, B, C, D, E, and F.

Therefore, in the case of the comparative example, when garbage collection is performed, the number of times of access to the nonvolatile memory 100 is increased and hence, access performance of the memory system is deteriorated.

That is to say, cache data stored by the LRU method are purged from the cache memory, and logical-to-physical address conversion information (including cold data) relating to garbage collection is stored in the cache memory and hence, the cache hit rate is lowered thereafter.

In contrast, according to the above-mentioned present embodiment, as described in the flowchart of the processing of reading and writing cache data from and into the cache memory in FIG. 2, in the case of reading or writing of user data, cache data are stored in the primary cache memory LUTc1. Further, in the case of garbage collection, cache data are stored in the secondary cache memory LUTc2. Logical-to-physical address conversion information relating to an access request from the host apparatus 300 is stored in the primary cache memory LUTc1 as cache data according to LRU and hence, it is possible to prevent a purge of cache data having a high possibility of a cache hit. As a result, the lowering of read performance of the memory system can be prevented.

As described above, according to the above-mentioned embodiment, it is possible to provide a memory system and a storage device that can improve the cache hit rate of a cache memory.

In the above-mentioned embodiment, garbage collection is taken as an example of processing where wide-area access is made. However, the above-mentioned embodiment is also applicable to another processing where wide-area access is made.

While certain embodiments have been described, these embodiments have been presented by way of example only, and are not intended to limit the scope of the inventions. Indeed, the novel devices described herein may be embodied in a variety of other forms; furthermore, various omissions, substitutions and changes in the form of the devices described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile memory;
a first cache memory;
a second cache memory; and
a control circuit configured to perform address conversion by using logical-to-physical address conversion information relating to data to be addressed in the nonvolatile memory, wherein
based on whether first processing is performed on the nonvolatile memory or second processing different from the first processing is performed on the nonvolatile memory, the control circuit controls whether the logical-to-physical address conversion information relating to the first processing is to be stored in the first cache memory as first cache data or logical-to-physical address conversion information relating to the second processing is to be stored in the second cache memory as second cache data, and
narrow area access data are stored in the first cache memory and wide area access data are stored in the second cache memory.

2. The memory system according to claim 1, wherein
in a case where the first cache memory becomes full of the first cache data, the control circuit moves the first cache data that are to be purged from the first cache memory to the second cache memory based on LRU, and stores the first cache data in the second cache memory.

3. The memory system according to claim 2, wherein
in a case where the second cache memory becomes full of the second cache data, the control circuit erases the second cache data that are to be erased from the second cache memory based on the LRU.

4. The memory system according to claim 1, wherein
in updating the second cache data stored in the second cache memory, the control circuit moves the second cache data to the first cache memory, stores the second cache data in the first cache memory, and updates the second cache data in the first cache memory.

5. The memory system according to claim 1, wherein
the first cache data stored in the first cache memory and the second cache data stored in the second cache memory do not overlap with each other.

6. The memory system according to claim 1, wherein
the second cache memory is provided in a memory which is included in a host apparatus which requests to write and to read the data into and from the nonvolatile memory, the request designating a logical address corresponding to a physical address of the nonvolatile memory.

7. The memory system according to claim 6, wherein
a storage capacity of the second cache memory is set by the host apparatus.

8. The memory system according to claim 6, wherein
the first processing is processing performed in response to the request from the host apparatus to read or write the data from or into the nonvolatile memory, and
the second processing is garbage collection performed on the nonvolatile memory.

9. The memory system according to claim 8, wherein the second processing is performed without an access request from the host apparatus.

10. The memory system according to claim 1, wherein
the memory system includes a memory controller including a processor that controls reading and writing of the data from and into the nonvolatile memory, and
the control circuit is the processor.

11. The memory system according to claim 1, wherein
the memory system includes a memory controller including a processor that controls reading and writing of the data from and into the nonvolatile memory, and
the control circuit is a processor different from the processor.

12. The memory system according to claim 1, wherein
the memory system includes a memory controller that controls reading and writing of the data from and into the nonvolatile memory, and
the first cache memory is included in the memory controller.

13. The memory system according to claim 1, wherein
the first cache data is not included in the second cache data.

14. A storage device comprising:
a nonvolatile memory;
a memory controller configured to control the nonvolatile memory;
a host apparatus configured to transmit a request to access the nonvolatile memory to the memory controller;

a first cache memory;

a second cache memory; and a control circuit configured to perform address conversion by using logical-to-physical address conversion information relating to data to be addressed in the nonvolatile memory, wherein based on whether first processing is performed on the nonvolatile memory or second processing different from the first processing is performed on the nonvolatile memory, the control circuit controls whether the logical-to-physical address conversion information relating to the first processing is to be stored in the first cache memory as first cache data or logical-to-physical address conversion information relating to the second processing is to be stored in the second cache memory as second cache data, and narrow area access data are stored in the first cache memory and wide area access data are stored in the second cache memory.

15. The storage device according to claim 14, wherein the first cache data is not included in the second cache data.

16. The storage device according to claim 14, wherein the second processing is performed without an access request from the host apparatus.

* * * * *